US012754349B2

(12) United States Patent
Psaila

(10) Patent No.: US 12,754,349 B2
(45) Date of Patent: Oct. 6, 2026

(54) SUB-SURFACE COMPOUND MICROLENSES

(71) Applicant: Intel Corporation, Santa Clara, CA (US)

(72) Inventor: Nicholas Psaila, Lanark (GB)

(73) Assignee: Intel Corporation, Santa Clara, CA (US)

( * ) Notice: Subject to any disclaimer, the term of this patent is extended or adjusted under 35 U.S.C. 154(b) by 329 days.

(21) Appl. No.: 18/451,223

(22) Filed: Aug. 17, 2023

(65) Prior Publication Data

US 2025/0060516 A1 Feb. 20, 2025

(51) Int. Cl.
*G02B 6/42* (2006.01)
*G02B 1/10* (2015.01)
*G02B 3/00* (2006.01)

(52) U.S. Cl.
CPC ............. *G02B 3/0056* (2013.01); *G02B 1/10* (2013.01); *G02B 6/4204* (2013.01); *G02B 6/4245* (2013.01)

(58) Field of Classification Search
CPC ........ G02B 3/0056; G02B 6/124; G02B 6/34; G02B 6/42-43; G02B 5/1866; G02B 6/4202
See application file for complete search history.

(56) References Cited

U.S. PATENT DOCUMENTS 6,016,185 A * 1/2000 Cullman ............. G03F 7/70275 355/53
6,847,761 B2 * 1/2005 Hamanaka ........... G02B 6/4204 385/33
6,980,717 B2 * 12/2005 Watanabe .............. G02B 6/327 385/33
6,992,842 B2 * 1/2006 Yamada ............... G02B 3/0087 359/741
7,043,119 B2 * 5/2006 Takeuchi ............... G02B 6/327 385/33
7,187,501 B2 * 3/2007 Wakisaka ............. G02B 3/0075 359/811

(Continued)

OTHER PUBLICATIONS

Barre, Nicolas et al."Direct laser-written aperiodic photonic vol. elements for complex light shaping with high efficiency: inverse design and fabrication", Adv. Photon. Nexus 2(3) May/Jun. 2023; pp. 036006-1 through 036006-9.

(Continued)

*Primary Examiner* — Rhonda S Peace
(74) *Attorney, Agent, or Firm* — Akona IP PC

(57) ABSTRACT

Photonic devices, packages, and systems with sub-surface compound microlenses are disclosed. An example microlens structure includes a glass core and a microlens stack embedded in the glass core, the stack comprising a plurality of regions stacked a direction of propagation of light that is to be manipulated by the microlens structure, wherein each region is a region of a substantially uniform refractive index that is different from the refractive index of the glass core. Such a stack may be referred to as a "sub-surface compound microlens," where the term "sub-surface" is indicative of the fact that the stack may be below all surfaces of the glass core (i.e., is embedded in the glass core) and the term "compound" is indicative of the fact that the stack is a compound arrangement of multiple regions (e.g., each region is an individual microlens).

25 Claims, 7 Drawing Sheets

(56) References Cited

U.S. PATENT DOCUMENTS

| | | | | |
|---|---|---|---|---|
| 9,152,057 | B2 * | 10/2015 | Mizumura | G03F 7/70275 |
| 9,184,199 | B2 * | 11/2015 | Pitts | G02B 3/0031 |
| 2004/0047557 | A1 * | 3/2004 | Muto | G02B 6/32 385/33 |
| 2005/0180028 | A1 * | 8/2005 | Yamada | G02B 6/4214 359/796 |
| 2008/0019639 | A1 * | 1/2008 | Donlagic | B29D 11/00692 385/35 |
| 2021/0191036 | A1 * | 6/2021 | Lipson | G02B 6/02052 |
| 2021/0271003 | A1 * | 9/2021 | Yang | G02B 5/285 |
| 2024/0201423 | A1 * | 6/2024 | Tao | G02B 27/0927 |
| 2025/0060516 | A1 * | 2/2025 | Psaila | G02B 1/10 |

OTHER PUBLICATIONS

Delullier, Pierre, et al."Femtosecond Laser Direct Writing of Gradient Index Fresnel Lens in GeS2-Based Chalcogenide Glass for Imaging Applications", App.Sci. 2022, 12, 4490, https://doi.org/10.3390/app12094490, 15 pages.

Douglass, G. et al."Two dimensional gradient-index beam shapers fabricated using ultrafast laser inscription", Opt. Express vol. 30, No. 22/Oct. 24, 2022; pp. 40592-40598.

Ocier, C. et al."Direct laser writing of volumetric gradient index lenses and waveguides", Light Sci Appl 9:196 (2020).

Porte, X et al."Direct (3+1)D laser writing of graded-index optical elements", Optica 8, pp. 1281-1297 (2021).

Wang, B. et al."Rapid Fabrication of Smooth Micro-Optical Components on Glass by Etching-Assisted Femtosecond Laser Modification" Materials 2022, 15, 8 pages.

* cited by examiner

SUB-SURFACE COMPOUND MICROLENSES

BACKGROUND

Microlenses are small-scale optical devices designed to manipulate light at a microscopic level. Microlenses may be used in a multitude of applications such as micro-optics, digital imaging, displays, and biomedical devices to bend, focus, collimate, or disperse light. For example, in micro-optics, microlenses may be used to manipulate light in photonic integrated circuits (PICs), microscopes, and other miniature optical systems. In imaging, microlenses may be used to help focus light onto individual photodetectors of digital imaging devices such as complementary metal-oxide-semiconductor (CMOS) image sensors in digital cameras and smartphones, improving image quality and sensitivity. In displays, microlenses may help improve brightness and clarity of displays such as liquid crystal displays (LCDs) and organic light-emitting diode (OLED) screens, by directing light from the backlight source or the OLED pixels to the viewer's eyes. In biomedical devices, microlenses may be used in medical imaging, endoscopy, and lab-on-a-chip devices, where they can assist in focusing light on small samples or within biological tissues.

Microlenses are typically made using advanced fabrication techniques, often involving photolithography or other microfabrication methods. A variety of factors can affect the cost, quality, and robustness of photonic devices that include microlenses. Physical constraints, such as space/surface area, can impose further constraints on such photonic devices. Thus, further improvements in microlenses are always desirable.

BRIEF DESCRIPTION OF THE DRAWINGS

Embodiments will be readily understood by the following detailed description in conjunction with the accompanying drawings.

DETAILED DESCRIPTION

Figure 3:
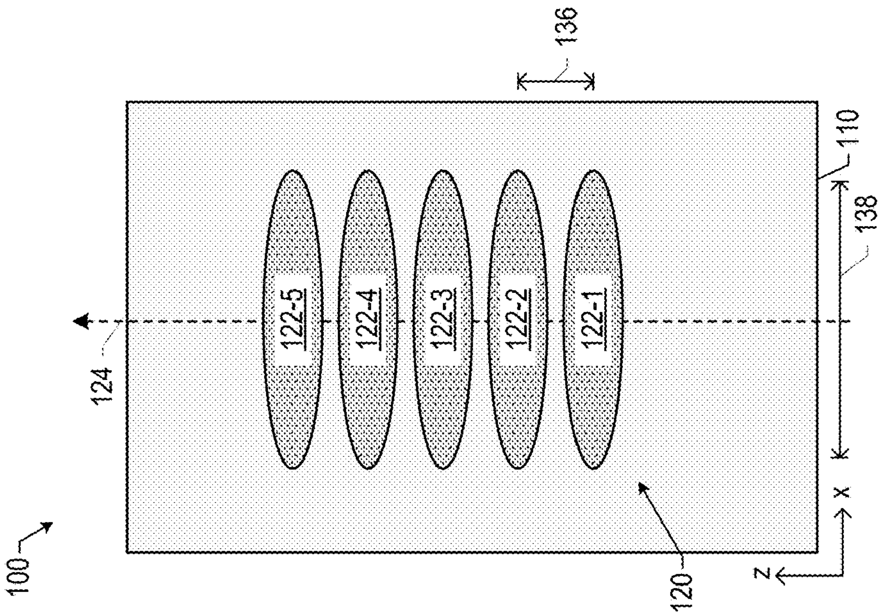
FIGS. 1-6 illustrate microlens structures with sub-surface compound microlenses according to various embodiments.

The systems, methods and devices of this disclosure each have several innovative aspects, no single one of which is solely responsible for all of the desirable attributes disclosed herein. Details of one or more implementations of the subject matter described in this specification are set forth in the description below and the accompanying drawings.

For purposes of illustrating sub-surface compound microlenses proposed herein, it might be useful to first understand phenomena that may come into play in context of microlenses. The following foundational information may be viewed as a basis from which the present disclosure may be properly explained. Such information is offered for purposes of explanation only and, accordingly, should not be construed in any way to limit the broad scope of the present disclosure and its potential applications.

Microlenses are devices that rely on the refractive index difference between the bulk material and the surrounding medium to focus or shape light in specific ways. Microlenses can bend, focus, collimate, or disperse light depending on their design and arrangement. Just like traditional lenses, microlenses work based on the principles of refraction and diffraction of light. As the name suggests, microlenses are on a micro-scale, meaning they are typically in the micrometer to millimeter range in terms of dimensions. They are much smaller than conventional lenses used in cameras and other optical devices.

Since functioning of microlenses relies on the refractive index difference between the bulk material and the surrounding medium, any changes in the properties of the medium surrounding the microlenses can impact their performance. Factors such as temperature, humidity, and the refractive index of the surrounding medium can all influence how light interacts with the microlenses and how effectively they perform their intended function.

Creating microlenses typically relies on surface-based refractive micro-optics structures which are commonly fabricated using grey-scale lithography. The exposed surfaces of surface-based microlenses are crucial to their performance. The curvature and shape of these surfaces determine how light is focused or manipulated. Even tiny imperfections or variations in the surface properties can lead to distortions in the light path, affecting the accuracy and efficiency of the microlenses. Therefore, the quality of fabrication and the materials used play a significant role in achieving the desired optical characteristics.

Producing microlens structures below the surface of a material substrate (i.e., producing sub-surface microlenses) is desirable as it can allow for isolation of the optical elements from the surroundings, for example for reducing performance susceptibility to the operational environment or for increasing compatibility with optical adhesives for assembly. However, fabricating sub-surface microlenses is challenging using existing sub-surface processing techniques such as ultrashort pulse direct writing due to the limited amount of refractive index contrast achievable and a lack of the precise refractive index control required to produce low loss graded index lenses through laser modification. This challenge is exacerbated further when a microlens needs to have a complicated profile of refractive index differences in a plane perpendicular to the direction of light propagation through the microlens, as is typically the case. For example, sub-surface microlenses implemented as bulk Fresnel lens using laser direct write techniques have been demonstrated in the past, but show poor lens performance and efficiency, and significant aberrations.

Disclosed herein are photonic devices (e.g., optical devices), packages, and systems with microlens structures that aim to improve on one or more challenges described above and allow formation of substantially stronger and higher performance sub-surface microlens arrays. An example microlens structure includes a glass core and a lens stack (e.g., a microlens stack) embedded in the glass core (i.e., a lens stack that is below all surfaces of the glass core), the stack comprising a plurality of regions stacked a direction of propagation of light that is to be manipulated by the microlens structure, wherein each region is a region of a substantially uniform refractive index that is different from the refractive index of the glass core. Refractive indices of different regions of the stack may be the same or different from region to region, as long as, within a given region, the refractive index is substantially uniform (i.e., constant), and, for all of the regions, the refractive index of the region is different from the refractive index of the glass core. Such a stack may be referred to as a "sub-surface compound microlens," where the term "sub-surface" is indicative of the fact that the stack may be below all surfaces of the glass core (i.e., is embedded in the glass core) and the term "compound" is indicative of the fact that the stack is a compound arrangement of multiple regions (e.g., each region is an individual microlens).

Sub-surface compound microlenses as described herein may provide a number of improvements over conventional microlenses. Because the stack is sub-surface, variations in the surrounding medium of the compound microlens may be reduced, compared to surface-based microlenses described above, enabling improved accuracy and efficiency of microlenses. Because each individual region of the stack is a region of a substantially constant refractive index, a profile of refractive index difference in a plane perpendicular to the direction of light propagation through a given region is simple, which is advantageous in terms of reducing complexity and cost of fabrication. For example, ultrashort pulse laser direct writing may be very well suited for forming such simple refractive index profile regions. Producing embedded refractive elements within the bulk of a material such as glass using ultrashort pulse laser direct write processing has advantages in allowing for flat external optical surfaces, high transmission efficiency, and ease of integration with mechanical alignment features and other optical elements such as waveguide circuits. Because multiple regions are stacked in the direction of light propagation, more complicated profiles of refractive index difference in a plane perpendicular to the direction of light propagation through the stack may be achieved. By carefully selecting shapes, sizes, and refractive indices of different regions within the stack, achievable amount of phase retardation across the aperture of the beam may be increased substantially compared to conventional sub-surface microlenses. This allows a much wider range of photonic/optical devices to be fabricated, such as micro-collimators or micro beam shapers for improving optical coupling. Even sub-surface compound microlenses with a simple binary refractive index difference (i.e., where all regions of the stack have the same refractive index, different from that of the surrounding glass core), made easily possible by ultrashort pulse laser direct writing techniques, allow creating a device that can functionally approximate a graded index lens combined with a multi-mode-intereference coupler.

Sub-surface compound microlenses as described herein may be used in a variety of applications, e.g., in optical coupling applications, such as creating collimated beams from arrays of waveguides or optical fibers for improved connectivity into and out of PICs. Sub-surface compound microlenses as described herein may be combined with waveguides and micromachined structures to allow for passively aligned optical elements for applications such as integration with PICs, expanded beam detachable optical connectors, and free-space optic integration with waveguide circuits.

In the following detailed description, reference is made to the accompanying drawings that form a part hereof wherein like numerals designate like parts throughout, and in which is shown, by way of illustration, embodiments that may be practiced. It is to be understood that other embodiments may be utilized, and structural or logical changes may be made, without departing from the scope of the present disclosure. Therefore, the following detailed description is not to be taken in a limiting sense.

Any of the features discussed with reference to any of accompanying drawings herein may be combined with any other features to form a microlens structure 100, a photonic device 200, a microelectronic package 2200, or a photonic device 2300, as appropriate. For convenience, the phrase "regions 122" may be used to refer to a collection of regions 122-1, 122-2, and so on. A number of elements of the drawings with same reference numerals may be shared between different drawings; for ease of discussion, a description of these elements provided with respect to one of the drawings is not repeated for the other drawings, and these elements may take the form of any of the embodiments disclosed herein. The drawings are not necessarily to scale. Although some of the drawings illustrate rectilinear structures with flat walls/surfaces and right-angle corners, this is simply for ease of illustration and may not reflect real-life process limitations which may cause various features to not look so "ideal" when any of the structures described herein are examined using e.g., microscopy images. In such images of real structures, possible processing defects could also be visible, e.g., not-perfectly straight edges of materials, tapered vias or other openings, inadvertent rounding of corners or variations in thicknesses of different material layers. There may be other defects not listed here but that are common within the field of semiconductor device fabrication and packaging. Inspection of layout and mask data and reverse engineering of parts of a device to reconstruct the circuit using e.g., optical microscopy or transmission electron microscopy, and/or inspection of a cross-section of a device to detect the shape and the location of various device elements described herein using, e.g., Physical Failure Analysis (PFA) would allow determination of presence of sub-surface compound microlenses as described herein.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). When used to describe a range of dimensions, the phrase "between X and Y" represents a range that includes X and Y. When used to describe a location of an element, the phrase "between X and Y" represents a region that is spatially between element X and element Y. The terms "substantially," "close," "approximately," "near," and "about," generally refer to being within +/−20%, e.g., within +/−5% or within +/−2%, of a target value based on the context of a particular value as described herein or as known in the art. Similarly, terms indicating orientation of various elements, e.g., "coplanar," "perpendicular," "orthogonal," "parallel," or any other angle between the elements, generally refer to being within +/−10%, e.g., within +/−5% or within +/−2%, of the exact orientation.

The description uses the phrases "in an embodiment" or "in embodiments," which may each refer to one or more of the same or different embodiments. Furthermore, the terms "comprising," "including," "having," and the like, as used with respect to embodiments of the present disclosure, are synonymous. As used herein, the terms "package" and "integrated circuit (IC) package" are synonymous, as are the terms "die" and "IC die." Furthermore, the terms "chip," "chiplet," "die," and "IC die" may be used interchangeably herein. Although certain elements may be referred to in the singular herein, such elements may include multiple sub-elements. For example, "an insulator material" may include one or more insulator materials.

FIGS. 1-6 illustrate microlens structures 100 with sub-surface compound microlenses according to various embodiments. FIGS. 1-6 illustrate cross-sectional side views in an x-z plane of an example coordinate system 105 illustrated in FIG. 1.

Figure 1:
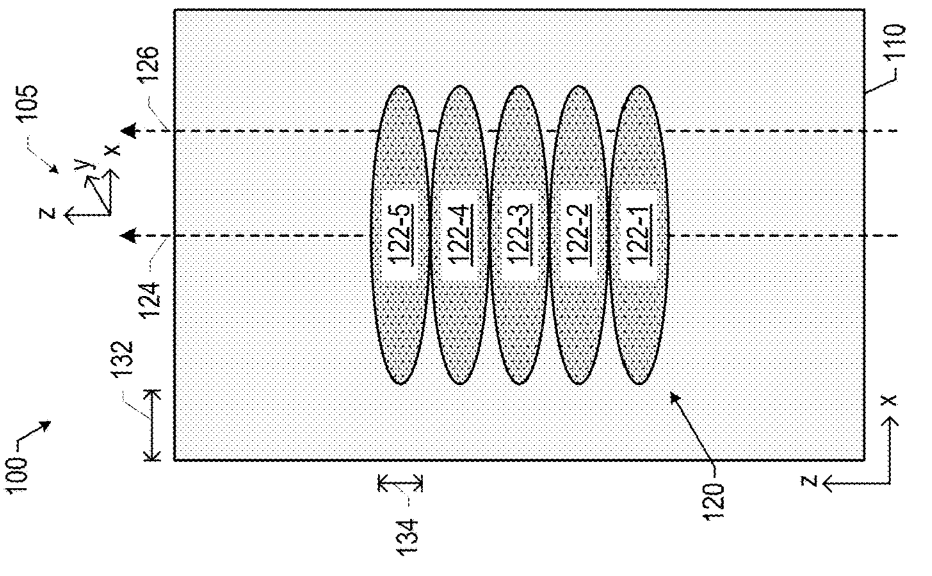

As shown in FIG. 1, a microlens structure 100 may include a glass core 110 and a microlens stack 120 (or, more generally, a lens stack 120) comprising a plurality of regions 122. Although five regions 122 are illustrated in FIG. 1, individually labeled as regions 122-1, 122-2, 122-3, 122-4, and 122-5, in various embodiments the microlens structure 100 may include any number of two or more regions 122.

As used herein, the glass core 110 refers to a structure (e.g., a portion of a glass layer) of any glass material such as quartz, silica, fused silica, silicate glass (e.g., borosilicate, aluminosilicate, alumino-borosilicate), soda-lime glass, soda-lime silica, borofloat glass, lead borate glass, photo-sensitive glass, non-photosensitive glass, or ceramic glass. In particular, the glass core 110 may be bulk glass or a solid volume/layer of glass, as opposed to, e.g., materials that may include particles of glass, such as glass fiber reinforced polymers. Such glass materials are typically non-crystalline, often transparent, amorphous solids. In some embodiments, the glass core 110 may be an amorphous solid glass layer. In some embodiments, the glass core 110 may include silicon and oxygen, as well as any one or more of aluminum, boron, magnesium, calcium, barium, tin, sodium, potassium, strontium, phosphorus, zirconium, lithium, titanium, and zinc. In some embodiments, the glass core 110 may include a material, e.g., any of the materials described above, with a weight percentage of silicon being at least about 0.5%, e.g., between about 0.5% and 50%, between about 1% and 48%, or at least about 23%. For example, if the glass core 110 is fused silica, the weight percentage of silicon may be about 47%. In some embodiments, the glass core 110 may include at least 23% silicon and/or at least 26% oxygen by weight, and, in some further embodiments, the glass core 110 may further include at least 5% aluminum by weight. In some embodiments, the glass core 110 may include any of the materials described above and may further include one or more additives such as $Al_2O_3$, $B_2O_3$, MgO, CaO, SrO, BaO, $SnO_2$, $Na_2O$, $K_2O$, SrO, $P_2O_3$, $ZrO_2$, $Li_2O$, Ti, and Zn. In some embodiments, the glass core 110 may be a layer of glass that does not include an organic adhesive or an organic material. In some embodiments, a cross-section of the glass core 110 in an x-z plane, a y-z plane, and/or an x-y plane of the coordinate system 105 may be substantially rectangular.

As shown in FIG. 1, the microlens stack 120 includes a plurality of regions 122 stacked along the direction of light propagation through the microlens structure 100, as indicated in FIG. 1 with an axis 124 that may be an axis of a light beam to propagate through the microlens structure 100, extending in the direction of the z-axis of the coordinate system 105. Each of the regions 122 may be a region of a material having a substantially uniform (i.e., constant) refractive index that is different from the refractive index of the glass core 110. Thus, each of the regions 122 may be seen as an individual microlens, but, together, the plurality of regions 122 may provide a varying refractive index, e.g., a periodically varying refractive index, along at least some directions parallel to the axis 124. For example, for the embodiment shown in FIG. 1 this may be along a direction 126, where the refractive index varies periodically between that of the glass core 110 and that of the regions 122. For the embodiment shown in FIG. 3, this may be along the axis 124, where, similarly, the refractive index varies periodically between that of the glass core 110 and that of the regions 122. The stacked arrangement of the plurality of regions 122 may function as a single compound microlens that is substantially stronger than any individual element, while also confining the beam and being able to exhibit multimode interference depending on the dimensions and refractive index profile. The individual regions 122 of the microlens stack 120 could be identical or could be individually tailored along the axis 124 of propagation to allow further control of the phase profile as the light beam propagates through the microlens structure 100.

In some embodiments, the microlens stack 120 may be fully embedded within the glass core 110, which means that it may be below all surfaces of the glass core 110 and may be referred to as a "sub-surface compound microlens." Fully embedding the microlens stack 120 within the glass core 110 may advantageously reduce variations in the surrounding medium because only the glass core 110 may surround the microlens stack 120 on all sides, enabling improved accuracy and efficiency of the microlens. In some embodiments, a distance between the microlens stack 120 and a surface of the glass core 110 that is closest to the microlens stack 120 may be between about 0.05 micrometers and 10000 micrometers, e.g., between about 1 micrometer and 1000 micrometers, or between about 5 micrometers and 100 micrometers. For the illustration of FIG. 1, such a distance may be a distance 132, measured along the x-axis of the coordinate system 105. However, in various embodiments, a distance between the bottom of the microlens stack 120 and the bottom of the glass core 110 or a distance between the top of the microlens stack 120 and the top of the glass core 110, both measured along the z-axis of the coordinate system 105, may be in about the same ranges as the distance 132. Furthermore, even though not specifically illustrated in the present drawings, in some embodiments, the microlens stack 120 may be only partially embedded within the glass core 110. For example, the top of the microlens stack 120 may be aligned with the top of the glass core 110, or the bottom of the microlens stack 120 may be aligned with the bottom of the glass core 110, or, more generally, one or more of the surfaces of the microlens stack 120 may be aligned with one or more of the surfaces of the glass core 110. Such embodiments may be advantageous in terms of simpler manufacturing.

In some embodiments, refractive indices of different regions 122 may be substantially the same, resulting in what may be referred to as a microlens "with a binary refractive index difference" (i.e., the glass core 110 has one refractive index and all of the regions 122 have another refractive index). This may be advantageous in terms of simpler manufacturing. In other embodiments, one or more of the regions 122 may have a refractive index that is different from a refractive index of one or more other regions 122, as long as all of the regions 122 have refractive indices that are different from the refractive index of the glass core 110. In some embodiments, an absolute value of a difference in the refractive index of the glass core 110 and a refractive index of one of the regions 122 (e.g., any one of the regions 122) may be between about 0.005 and about 0.015.

Individual regions 122 may be created using a range of techniques, including ultrashort pulse laser direct writing.

These techniques can create well-controlled sub-surface three-dimensional structures but may be limited in the magnitude of the refractive index contrast that is possible to induce. This was limiting applicability of these fabrication techniques and feasibility of creating sub-surface microlenses with adequate performance for conventional approaches to creating complex refractive index profiles of microlenses. This limitation is advantageously lifted with the microlens stack 120 because individual regions 122 do not need to have complex refractive index profiles. In fact, all of the regions 122 may be as simple as to have the same refractive index, but stacking them along the direction of the axis 124 and carefully selecting their shapes, sizes, and arrangement with respect to one another (e.g., distance between one another, or offset with respect to the axis 124) allows creating any desired refractive index profile.

In some embodiments, the plurality of regions 122 may be stacked so that the optical axes of all of the regions 122 (also extending in the direction of the z-axis of the coordinate system 105) are aligned with the axis 124, as is shown in FIG. 1. However, this may be different in other embodiments, depending on the desired refractive index profile to be achieved along the direction of light propagation (i.e., the z-axis) in different x-y planes of the coordinate system 105.

Figure 6:
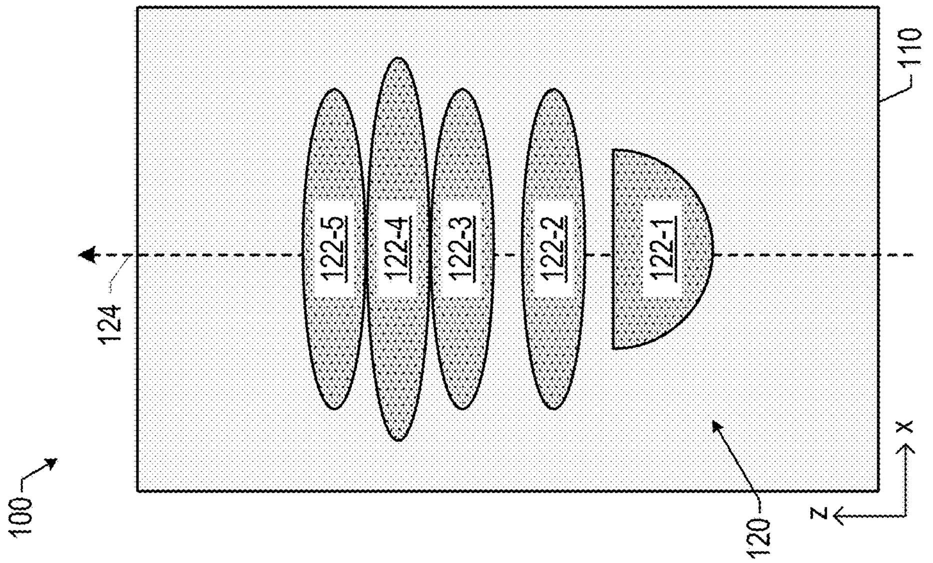
Figure 5:
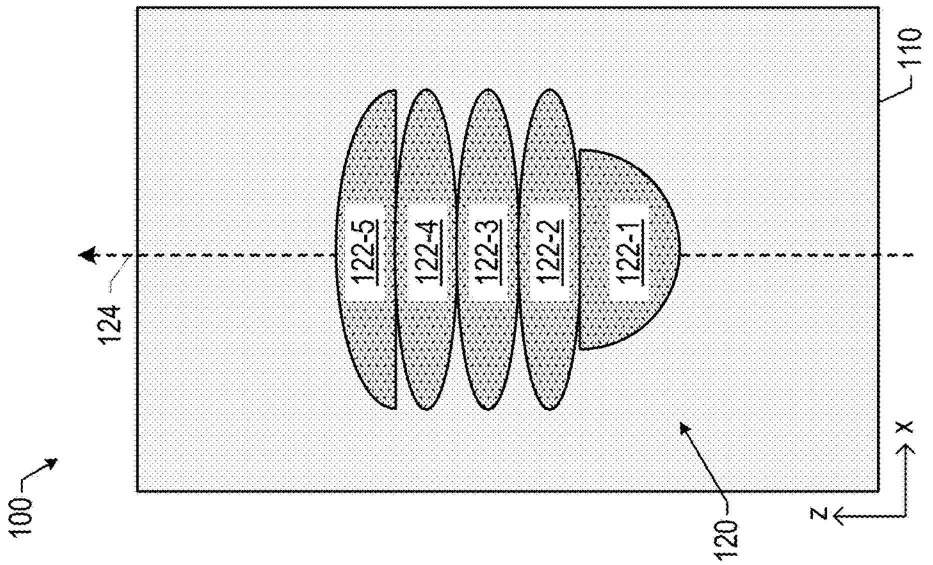
Figure 4:
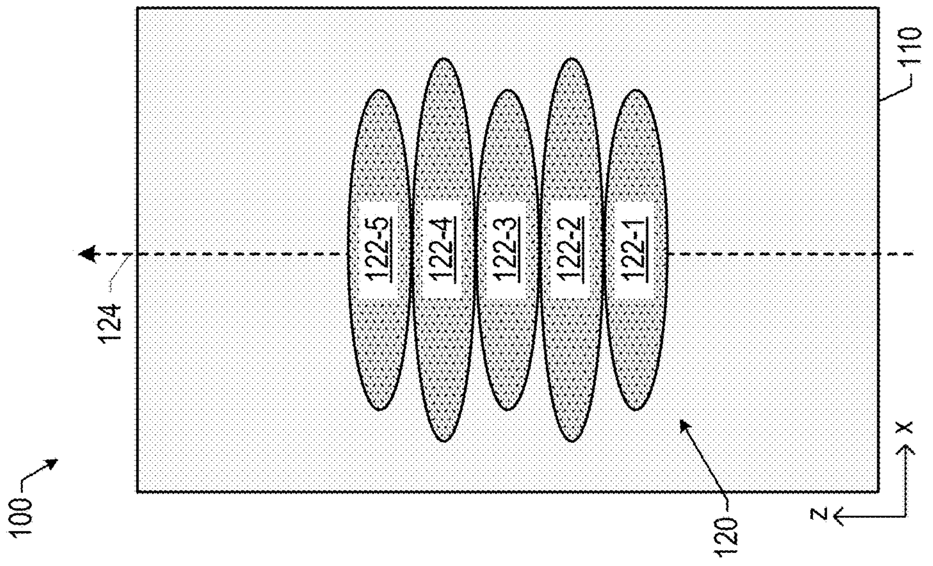

Individual regions 122 may have any suitable shape required to generate a target phase retardation profile when the light traverses the microlens stack 120. For example, in various embodiments, shapes of different regions 122 of the microlens stack 120, e.g., as seen in a cross-sectional side view as shown in FIGS. 1-6, may be biconvex (a shape that includes two convex surfaces), spherical, aspherical, conical, etc. FIGS. 1-4 illustrate examples with all of the regions 122 having biconvex shapes in the x-z plane, while FIGS. 5-6 illustrate examples with some of the regions 122 having different shapes. In some embodiments, at least two of the regions 122 may have the same shape. In some embodiments, at least two of the regions 122 may have different shapes. In some embodiments, a single microlens stack 120 may include two or more regions 122 that have the same shape and at least one other region 122 that has a different shape, e.g., as shown in FIGS. 4-6.

Having a region 122 being shaped so that, for at least two different values along the x-axis of the coordinate system 105, dimensions of the region 122 along the z-axis (e.g., dimensions such as a dimension 134 shown in FIG. 1 for one of the regions 122 when measured along the axis 124, which may be referred to as a "length" of a region 122 in a cross-sectional side view) are different, advantageously allows creating variability in the effective refractive index of the microlens stack 120 along the x-axis. This is because the effective refractive index of the microlens stack 120 for a given value on the x-axis is a weighted average of materials with different refractive indices provided along the z-axis, where the weights may be based on the lengths of these materials (i.e., their dimensions along the z-axis). For example, the effective refractive index of the microlens stack 120 along the axis 124 of FIG. 1 will be closer to the refractive index of the regions 122 than the effective refractive index of the microlens stack 120 along the direction 126 of FIG. 1. More generally, having a region 122 being shaped so that, for at least two different points in a given x-y plane of the coordinate system 105, dimensions 134 of the region 122 along the z-axis are different, advantageously allows creating variability in the effective refractive index of the microlens stack 120 in the x-y plane. Shapes such as biconvex, convex, concave, spherical, aspherical, conical, etc., for at least some of the regions 122 allows creating this variability in the x-y plane, which, in turn, allows creating complicated profiles of effective refractive indices of the microlens stack 120 at different points in the x-y plane.

In some embodiments, for a given point in the x-y plane of the coordinate system 105, at least two of the regions 122 may have the same length. In various embodiments, the length of any of the regions 122 (i.e., the dimension 134) for a given point in a x-y plane may be between about 1 micrometer and 1000 micrometers, e.g., between about 5 micrometers and 100 micrometers, or between about 10 micrometers and 40 micrometers. In some embodiments, at least two of the regions 122 may have different lengths for a given point in the x-y plane of the coordinate system 105. In relative terms, in some embodiments, the difference in lengths of a pair of different regions 122 may be between about 0.1% and 5000% of a length of one of the regions 122 of the pair, e.g., between about 5% and 1000%, or between about 10% and 200%. In some embodiments, a single microlens stack 120 may include two or more regions 122 that have the same length and at least one other region 122 that has a different length, e.g., as shown in FIGS. 5-6.

Figure 2:
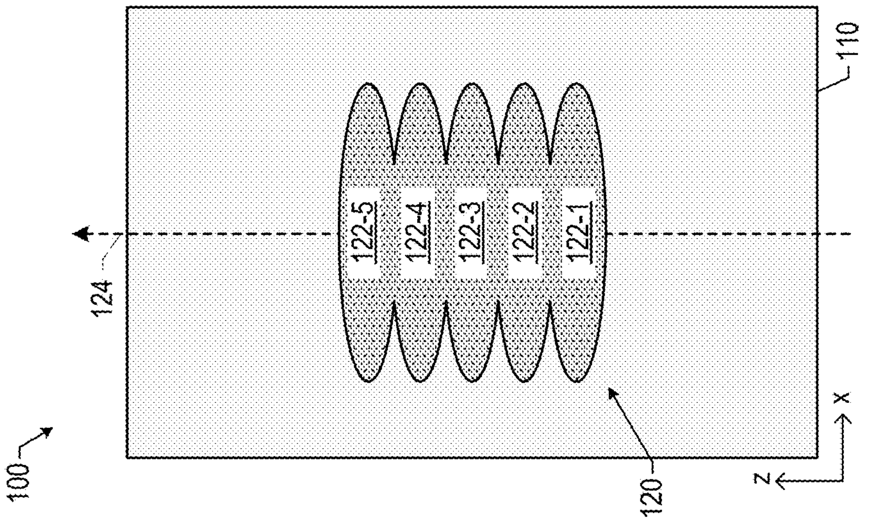

FIG. 1 illustrates an embodiment where at least some of the adjacent regions 122, e.g., all of the adjacent regions 122, are in contact with one another. FIG. 2 illustrates another variation of a microlens structure 100 as described above, except that at least some of the adjacent regions 122, e.g., all of the adjacent regions 122, overlap with one another. FIG. 3 illustrates yet another variation of a microlens structure 100 as described above, showing that, in some embodiments, at least some of the adjacent regions 122, e.g., all of the adjacent regions 122, may be spaced apart from one another in the direction of light propagation. In some embodiments, a distance between a pair of adjacent regions 122, shown in FIG. 3 as a distance 136 for one example pair of adjacent regions 122-1 and 122-2, may be between about 0.5 micrometers and 1000 micrometers, e.g., between about 0.5 micrometers and 500 micrometers, or between about 0.5 micrometers and 100 micrometers. In relative terms, in some embodiments, the distance 136 between a pair of adjacent regions 122 may be between about 0.1% and 200% of a dimension 138 of one of the regions 122 of the pair (e.g., of the region 122-1) in a direction perpendicular to the direction of light propagation, e.g., between about 0.1% and 100%, or between about 0.5% and 50%. The dimension 138 may, e.g., be a diameter of a region 122 in a plane perpendicular to the direction of light propagation (i.e., in an x-y plane of the coordinate system 105).

While the dimension 138 is only shown in FIG. 3, this dimension, which may be referred to as a "width" of a region 122 in a cross-sectional side view, may be defined for any of the regions 122 of any of the microlens structure 100 shown in FIGS. 1-6. In some embodiments, at least two of the regions 122 may have the same width. For example, for a given value along the z-axis of the coordinate system 105, a width of any of the regions 122 (e.g., the dimension 138) may be between about 1 micrometer and 2000 micrometers, e.g., between about 25 micrometers and 750 micrometers, or between about 50 micrometers and 250 micrometers. In some embodiments, at least two of the regions 122 may have different widths. In relative terms, in some embodiments, the difference in widths of a pair of different regions 122 may be between about 5% and 1000% of a width of one of the regions 122 of the pair, e.g., between about 20% and 500%, or between about 50% and 200%. In some embodiments, a single microlens stack 120 may include two or more regions 122 that have the same widths and at least one other region 122 that has a different width, e.g., as shown in FIGS. 4-6.

FIGS. 1-3 illustrate embodiments where the largest dimensions 138 of different regions 122 of a given microlens stack 120 are the same, while FIGS. 4-6 illustrate other variations of a microlens structure 100 as described above, where the dimensions 138 of at least some of the regions 122 are different.

Various arrangements of the microlens structure 100 as shown in FIGS. 1-6 do not represent an exhaustive set of microlens structures 100 in which sub-surface compound microlenses as described herein may be implemented, but merely provide examples of such microlens structures. In particular, the number and positions of various elements shown in FIGS. 1-6 is purely illustrative and, in various other embodiments, other numbers of these elements, provided in other locations relative to one another may be used in accordance with the general architecture considerations described herein. Furthermore, features of the microlens structure 100 described with reference to one of FIGS. 1-6 may be combined with any features described with reference to another one of FIGS. 1-6. For example, while FIG. 5 illustrates an embodiment where not only different regions 122 have different shapes but also some of the regions 122 have different widths (e.g., FIG. 5 illustrates that the region 122-1 has a different width compared to other regions 122), in a further embodiment of the microlens structure 100, different regions 122 may have different shapes but the same widths (e.g., a combination of FIG. 5 and FIG. 1).

Figure 8:
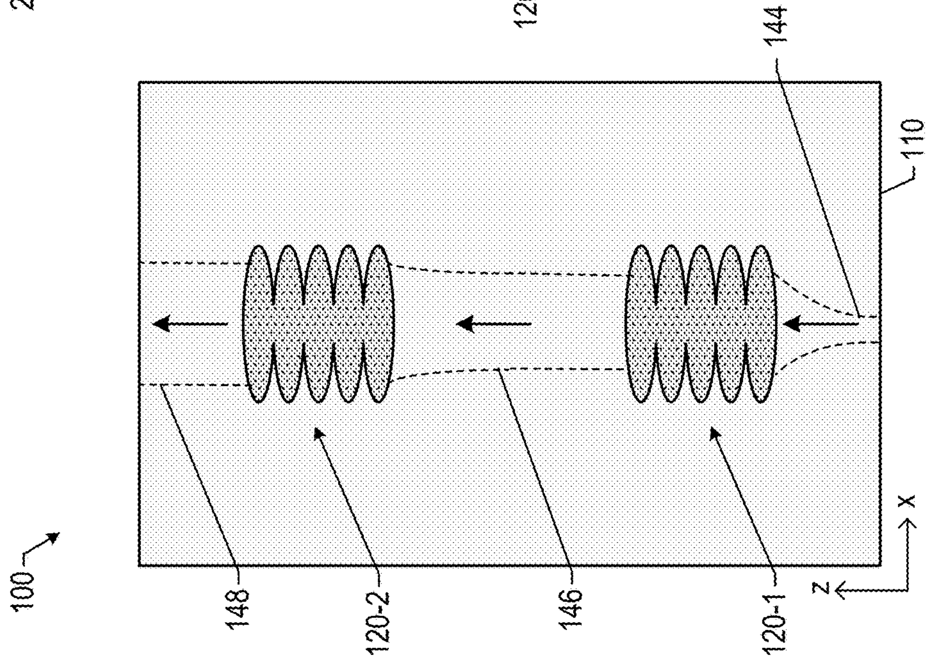
FIGS. 7-8 illustrate light propagation through microlens structures with sub-surface compound microlenses, according to some embodiments.
Figure 7:
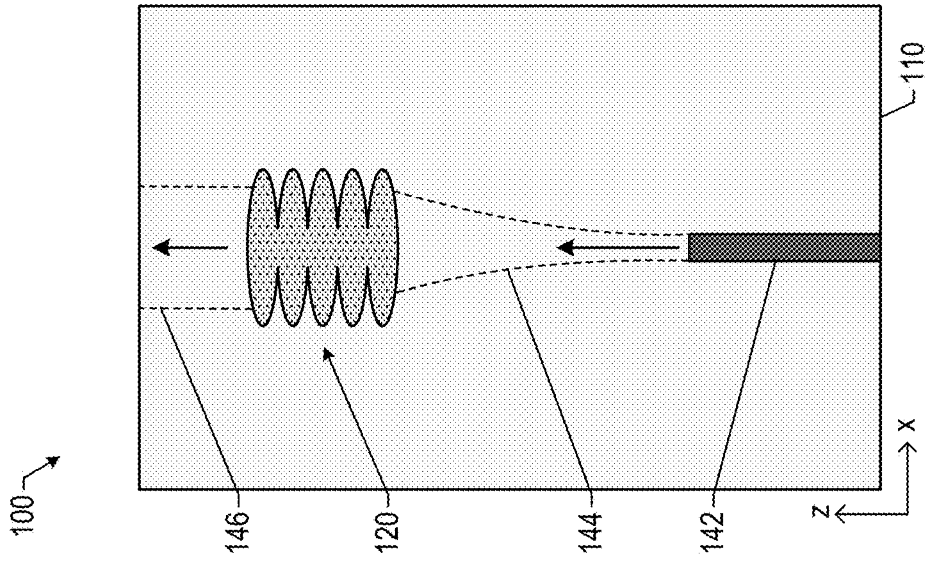

FIGS. 7-8 illustrate light propagation through microlens structures 100 with sub-surface compound microlenses in the form of microlens stacks 120, according to some embodiments. Any of the microlens stacks 120 of the microlens structures 100 as shown in FIGS. 7-8 may be a microlens stack 120 according to any embodiment, or any combination of embodiments, as described with reference to FIGS. 1-6.

FIG. 7 generally illustrates how a light guiding component 142, e.g., a waveguide, may send a light beam 144 towards a microlens stack 120, along the axis 124, and the microlens stack 120 may modify the light beam 144 so that a modified light beam 146 emerges at the opposite side of the microlens stack 120. In particular, FIG. 7 illustrates an example where the modification is that the microlens stack 120 applies collimation to the light beam 144 to output a collimated light beam 146. Light collimation refers to the process of making a beam of light parallel or nearly parallel. In other words, it involves aligning individual light rays in a way that they travel in a substantially straight path and do not diverge (spread out) significantly over a certain distance. Collimated light is important in various scientific, industrial, and technological applications. In other embodiments, a microlens stack 120 may apply a different modification to an input light beam (e.g., a light beam 144) to generate an output light beam (e.g., a light beam 146), such as bending, focusing, or dispersing light, or create changes in the beam shape such as top-hat beam profiles.

FIG. 7 illustrates that the microlens structure 100 may include a free-space region between the light guiding component 142 and the input of the microlens stack 120, which allows for the expansion of the light beam 144, e.g., through free-space diffraction. The microlens stack 120 may then be configured to modify the light beam 144 to create a desired function (e.g., collimation or focusing) for the output light beam 146. FIG. 7 also illustrates that the dimensions of the microlens stack 120 may be designed to have the appropriate diameter to be at least large enough to capture the incident light beam 144, and the appropriate shape and stack length to create the desired phase retardation profile across the beam to generate the target output light beam 146.

Achieving target light beam modification (e.g., achieving perfect collimation of a light beam) is often challenging due to factors like diffraction, imperfections in optical components, and wavelength-dependent behavior of light. Providing multiple microlens stacks 120 in the path of a light beam may help with this. An example of that is shown in FIG. 8, illustrating an embodiment where two microlens stacks 120 may be used within a single glass core 110, where a first microlens stack 120-1 may receive a light beam 144 as an input and generate a modified light beam 146 as an output, and then the light beam 146 may be provided as an input to a second microlens stack 120-2 which may then generate a further modified light beam 148 as an output. The example illustrated in FIG. 8 shows how multiple microlens stacks in the path of the light beam 144 allow creating successively more collimated light beam. However, in other embodiments, any of the multiple microlens stacks 120 provided in a path of a given light beam may apply any desired modification as needed for a particular design/application. In general, implementing multiple microlens stacks 120 in a path of a light beam may allow implementing more complex beam profiles and shapes and may be used for mode shaping, higher order mode conversion, or flat top beam generation, as an example. Multiple sets of microlens stacks 120 could also be used in applications where conventional lenses would be used in groups to create more complex multi-element optical systems such as telescopes and numerical aperture conversion. One example is in beam shape conversion for astigmatic beams such as those typically emerging from edge-emitter lasers or edge-emitting PICs, where orthogonal cylindrical lens stacks could be positioned sequentially to achieve fast axis and slow axis collimation from the astigmatic beam waist.

Figure 9:
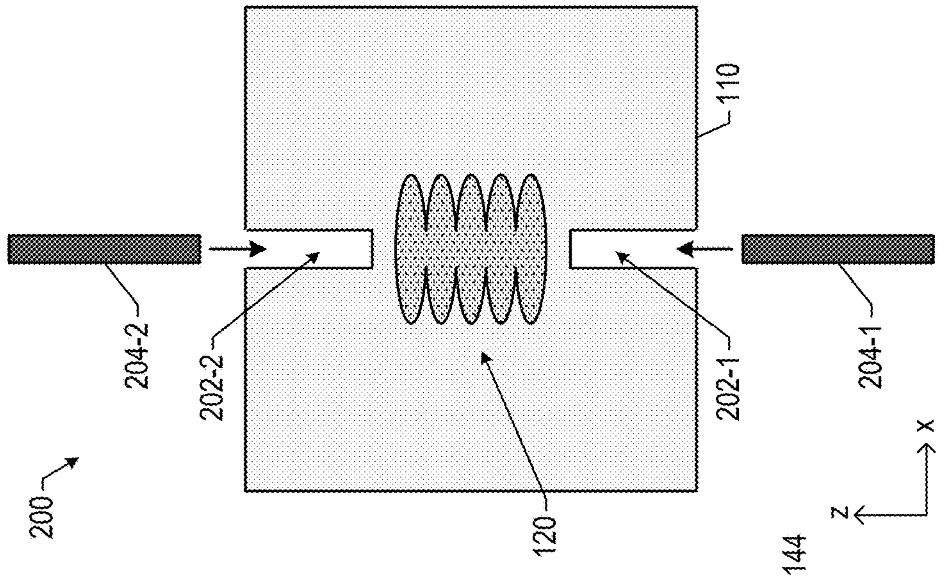
FIGS. 9-11 illustrate photonic devices with additional features associated with sub-surface compound microlenses, according to some embodiments.
Figure 10:
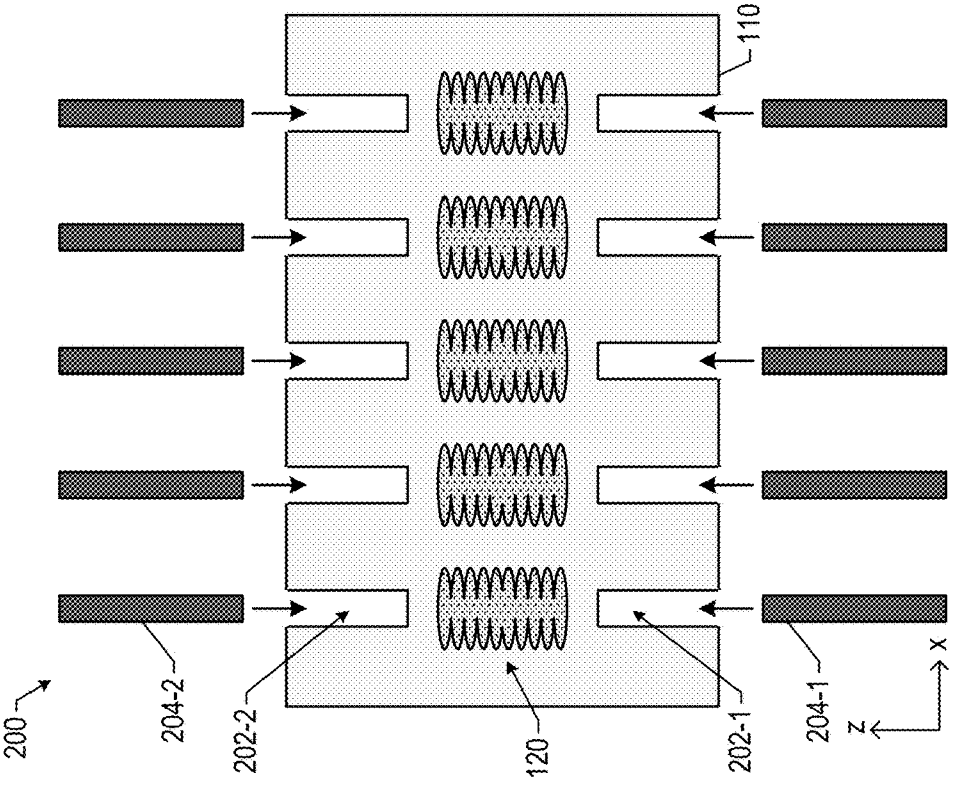
Figure 11:
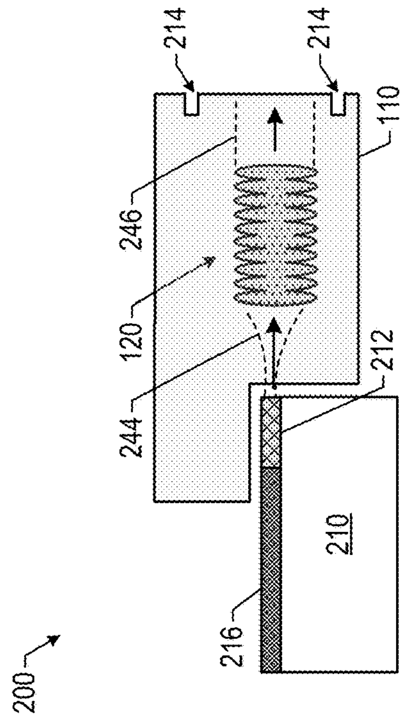

FIGS. 9-11 illustrate photonic devices 200 with additional features associated with sub-surface compound microlenses in the form of microlens stacks 120, according to some embodiments. Any of the microlens stacks 120 of the microlens structures 100 as shown in FIGS. 9-11 may be a microlens stack 120 according to any embodiment, or any combination of embodiments, as described with reference to FIGS. 1-6, or may be replaced by a sequence of two or more microlens stacks 120, as described with reference to FIG. 8.

FIG. 9 illustrates a photonic device 200 that includes a microlens structure 100 according to any of the embodiments described herein, where the glass core 110 may have openings 202 at one or more surfaces of the glass core 110 for receiving respective light guiding components 204 such as waveguides or optical fibers. In particular, FIG. 9 illustrates an opening 202-1 at one surface of the glass core 110, for receiving a light guiding component 204-1, and an opening 202-2 at another surface of the glass core 110, for receiving a light guiding component 204-2. One of the light guiding components 204 may provide an input light beam to the microlens stack 120, while the other one may receive a modified output light beam produced by the microlens stack 120 based on the input light beam. The openings 202 may help align the light guiding components 204 with the microlens stack 120. In other embodiments, one of the openings 202 shown in FIG. 9 may be absent, and/or any of the openings 202 may be replaced by protrusions of the glass core 110, grooves in the glass core 110, holes in the glass core 110, or any other features configured to align the light guiding components 204 with the microlens stack 120. Furthermore, even though not specifically shown in the present drawings, in further embodiments, any embodiments of the openings 202 or other features for aligning the light guiding components 204 with the microlens stack 120 may be combined with mechanical alignment features for connecting mating.

FIG. 10 illustrates a photonic device 200 that includes an array of microlens stacks 120, each associated with two openings 202 and two light guiding components 204 as described with reference to FIG. 9. Although FIG. 10 illustrates an array with five microlens stacks 120, any other number of the microlens stacks 120 may be used in other embodiments. Although FIG. 10 illustrates a one-dimensional array (i.e., multiple microlens stacks 120 are arranged along the x-axis), in further embodiments, a photonic device 200 may implement a two-dimensional array of the microlens stacks 120. Two-dimensional arrays of the microlens stacks 120 may be used to implement collimators for free-space optical switching applications, or may be used in phased array beam steering applications.

Other device examples that may benefit from using microlens stacks 120 include coupling components for photonic integration, for applications such as coupling to and from PICs. This can allow functionality such as expanded beam formation directly from PIC facets, or to create foci at a predefined distance away from the facet of an optical device, which could be used to, e.g., traverse gaps created by other mechanical constraints in optical assemblies. FIG. 11 shows an example of a photonic device 200 where a microlens stack 120 embedded in the glass core 110 is integrated with a PIC 210, to allow coupling to or from the PIC 210. The PIC 210 may be an example of a PIC 2306 shown in FIG. 14. FIG. 11 illustrates that the PIC 210 may include an output coupling element 212, such as an edge coupler, configured to provide an input light beam 244 to the microlens stack 120, and the microlens stack 120 may then output a modified output light beam 246. Descriptions provided with respect to the light beams 144, 146, 148 are applicable to the light beams 244, 246. FIG. 11 also illustrates that the photonic device 200 may include one or more mechanical alignment features 214 (e.g., openings) for aligning the output light beam 246 with a further component (not shown). FIG. 11 further illustrates a waveguide layer 216, which may be used for routing and manipulating light signals within the PIC 210, and may contain a range of subcomponents such as modulators, filters and photodetectors.

Figure 12:
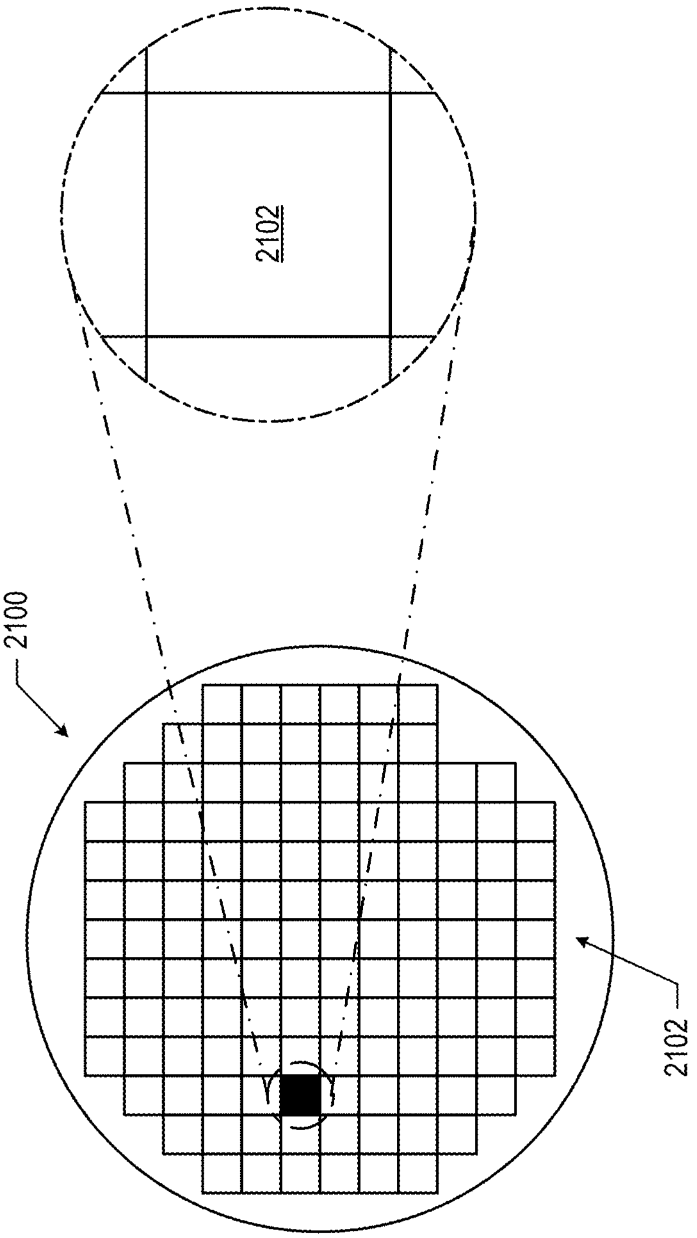
FIG. 12 is a top view of a wafer and dies that may be included in a microelectronic package or a photonic device with one or more microlens structures with sub-surface compound microlenses, according to an embodiment.
Figure 13:
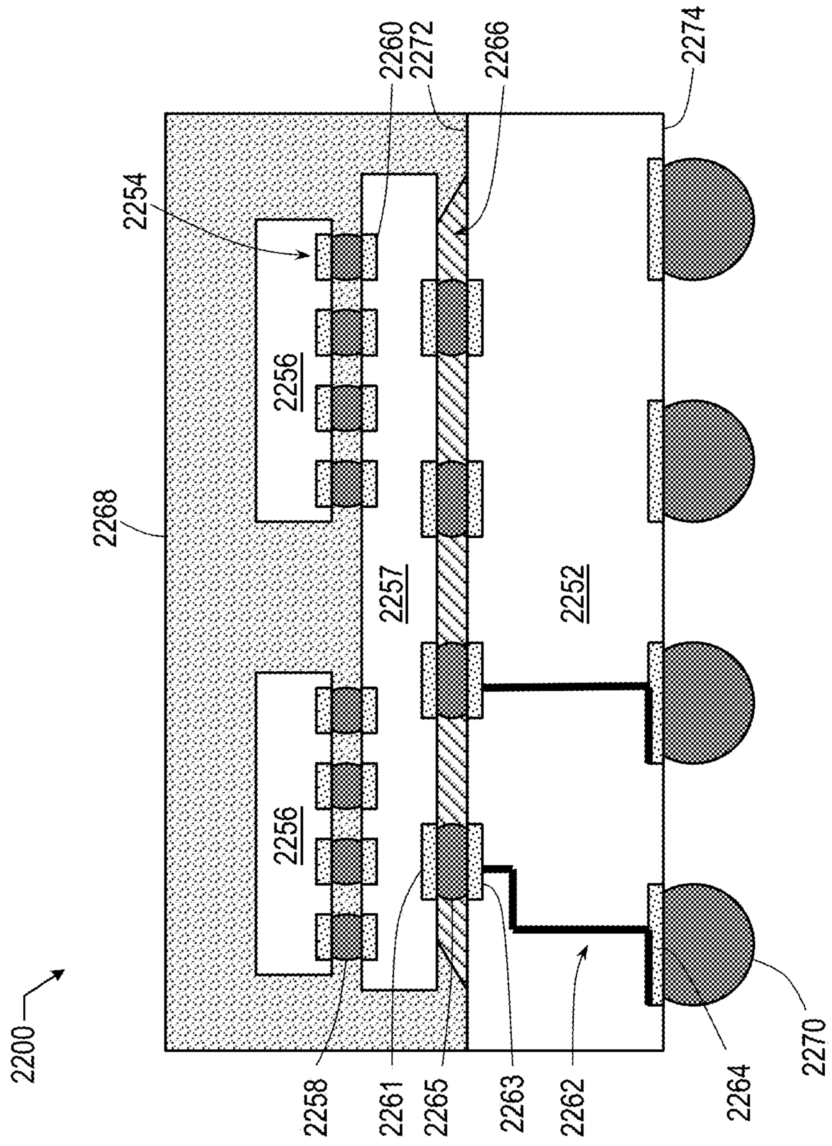
FIG. 13 is a side, cross-sectional view of an example microelectronic package that may include one or more microlens structures with one or more sub-surface compound microlenses, according to an embodiment.
Figure 14:
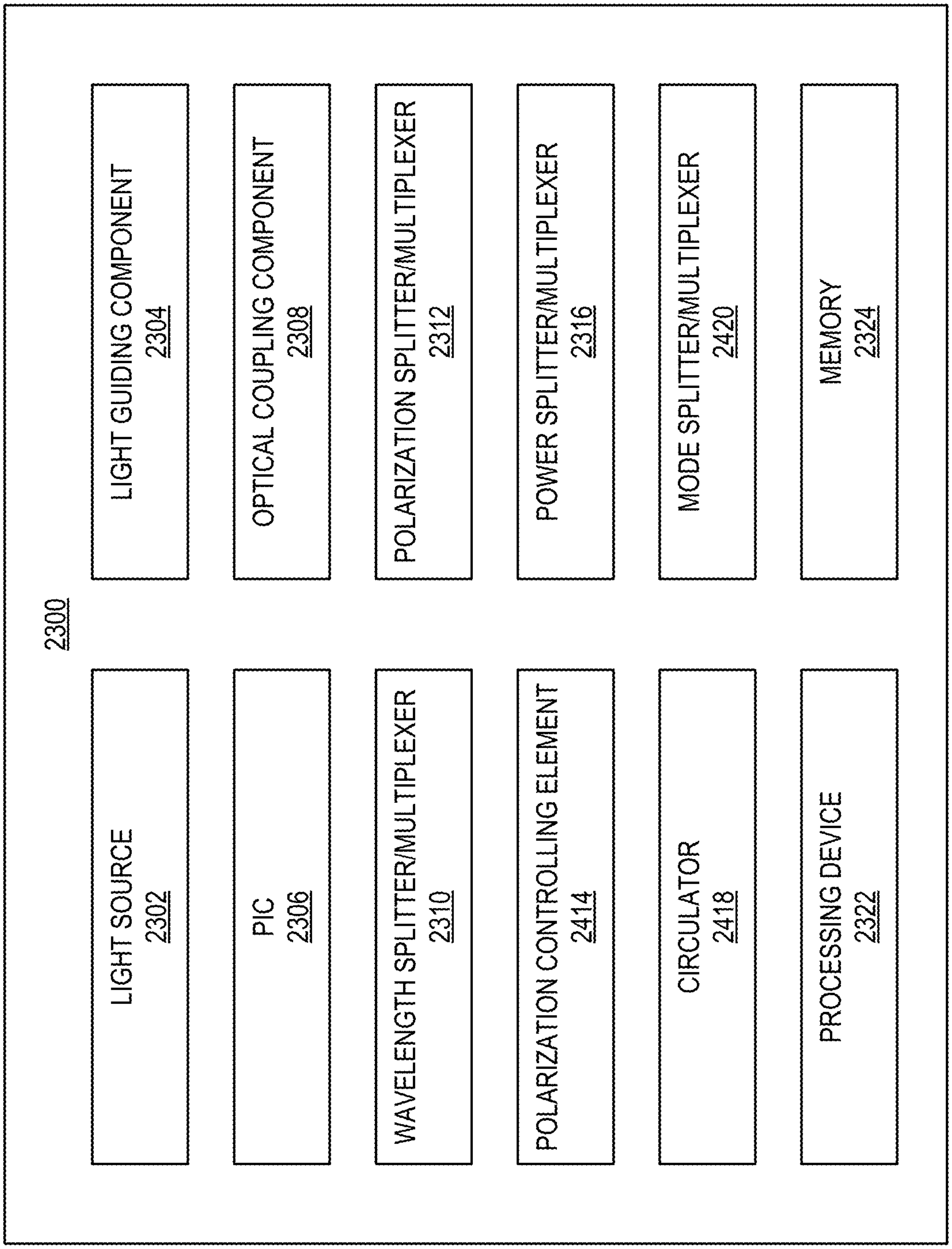
FIG. 14 is a block diagram of a photonic device that may include one or more microlens structures with one or more sub-surface compound microlenses, according to an embodiment.

Arrangements with one or more microlens structures 100 implementing sub-surface compound microlenses in the form of microlens stacks 120 as disclosed herein may be included in any suitable component or electronic device. FIGS. 12-14 illustrate various examples of devices and components that may include one or more microlens structures 100 with sub-surface compound microlenses in the form of microlens stacks 120 as disclosed herein.

FIG. 12 illustrates top views of a wafer 2100 and dies 2102 that may include one or more microlens structures 100 with one or more microlens stacks 120 in accordance with any of the embodiments disclosed herein. In some embodiments, the dies 2102 may be included in an IC package, in accordance with any of the embodiments disclosed herein. For example, any of the dies 2102 may serve as any of the dies 2256 in an IC package 2200 shown in FIG. 13. The wafer 2100 may be composed of semiconductor material and may include one or more dies 2102 having IC structures formed on a surface of the wafer 2100. Each of the dies 2102 may be a repeating unit of a semiconductor product that includes any suitable IC (e.g., ICs including one or more PICs as described herein, e.g., the PIC 210 of FIG. 11). At least some of the dies 2102 may further include one or more microlens structures 100 with one or more microlens stacks 120 implemented on, or attached to the die 2102. After the fabrication of the semiconductor product is complete (e.g., after manufacture of any embodiment of the microlens structures 100 with one or more microlens stacks 120 as disclosed herein), the wafer 2100 may undergo a singulation process in which each of the dies 2102 is separated from one another to provide discrete "chips" of the semiconductor product. In particular, devices that include one or more microlens structures 100 with one or more microlens stacks 120 as disclosed herein may take the form of the wafer 2100 (e.g., not singulated) or the form of the die 2102 (e.g., singulated). The die 2102 may include supporting circuitry to route electrical and/or optical signals to various components, e.g., to various microlens structures 100 with one or more microlens stacks 120, as well as to various transistors, capacitors, resistors, or any other IC components.

FIG. 13 is a side, cross-sectional view of an example microelectronic package 2200 that may include one or more microlens structures 100 with one or more microlens stacks 120 in accordance with any of the embodiments disclosed herein. In some embodiments, the microelectronic package 2200 may be a system-in-package (SiP).

The package substrate 2252 may be formed of a dielectric material (e.g., a ceramic, a buildup film, an epoxy film having filler particles therein, etc.), and may have conductive pathways 2262 extending through the dielectric material between the face 2272 and the face 2274, or between different locations on the face 2272, and/or between different locations on the face 2274.

The package substrate 2252 may include conductive contacts 2263 that are coupled to conductive pathways 2262 through the package substrate 2252, allowing circuitry within the dies 2256 and/or the interposer 2257 to electrically couple to various ones of the conductive contacts 2264 (or to other devices included in the package substrate 2252, not shown).

The microelectronic package 2200 may include an interposer 2257 coupled to the package substrate 2252 via conductive contacts 2261 of the interposer 2257, first-level interconnects 2265, and the conductive contacts 2263 of the package substrate 2252. The first-level interconnects 2265 illustrated in FIG. 13 are solder bumps, but any suitable first-level interconnects 2265 may be used. In some embodiments, no interposer 2257 may be included in the microelectronic package 2200; instead, the dies 2256 may be coupled directly to the conductive contacts 2263 at the face 2272 by first-level interconnects 2265.

The microelectronic package 2200 may include one or more dies 2256 coupled to the interposer 2257 via conductive contacts 2254 of the dies 2256, first-level interconnects 2258, and conductive contacts 2260 of the interposer 2257. The conductive contacts 2260 may be coupled to conductive pathways (not shown) through the interposer 2257, allowing circuitry within the dies 2256 to electrically couple to various ones of the conductive contacts 2261 (or to other devices included in the interposer 2257, not shown). The first-level interconnects 2258 illustrated in FIG. 13 are solder bumps, but any suitable first-level interconnects 2258 may be used. As used herein, a "conductive contact" may refer to a portion of electrically conductive material (e.g., metal) serving as an interface between different components; conductive contacts may be recessed in, flush with, or extending away from a surface of a component, and may take any suitable form (e.g., a conductive pad or socket).

In some embodiments, an underfill material 2266 may be disposed between the package substrate 2252 and the interposer 2257 around the first-level interconnects 2265, and a mold compound 2268 may be disposed around the dies 2256 and the interposer 2257 and in contact with the package substrate 2252. In some embodiments, the underfill material 2266 may be the same as the mold compound 2268. Example materials that may be used for the underfill material 2266 and the mold compound 2268 are epoxy mold materials, as suitable. Second-level interconnects 2270 may be coupled to the conductive contacts 2264. The second-level interconnects 2270 illustrated in FIG. 13 are solder balls (e.g., for a ball grid array arrangement), but any suitable second-level interconnects 22770 may be used (e.g., pins in a pin grid array arrangement or lands in a land grid array arrangement). The second-level interconnects 2270 may be used to couple the microelectronic package 2200 to another component, such as a circuit board (e.g., a motherboard), an interposer, or another IC package, as known in the art.

The dies 2256 may take the form of any of the embodiments of the die 2102 discussed herein (e.g., may include any of the embodiments of the IC devices implementing microlens structures 100 with one or more microlens stacks 120 as disclosed herein). In embodiments in which the microelectronic package 2200 includes multiple dies 2256, the microelectronic package 2200 may be referred to as a multi-chip package (MCP). The dies 2256 may include circuitry to perform any desired functionality. In some embodiments, any of the dies 2256 may include one or more microlens structures 100 with one or more microlens stacks 120 as discussed above; in some embodiments, at least some of the dies 2256 may not include any microlens structures 100.

The microelectronic package 2200 illustrated in FIG. 13 may be a flip chip package, although other package architectures may be used. For example, the microelectronic package 2200 may be a ball grid array (BGA) package, such as an embedded wafer-level ball grid array (eWLB) package. In another example, the microelectronic package 2200 may be a wafer-level chip scale package (WLCSP) or a panel fan-out (FO) package. Although two dies 2256 are illustrated in the microelectronic package 2200 of FIG. 13, an IC package 2200 may include any desired number of the dies 2256. An IC package 2200 may include additional passive components, such as surface-mount resistors, capacitors, and inductors disposed on the first face 2272 or the second face 2274 of the package substrate 2252, or on either face of the interposer 2257. More generally, an IC package 2200 may include any other active or passive components known in the art.

FIG. 14 is a block diagram of an example photonic device 2300 that may include one or more components in which the microlens structures 100 with one or more microlens stacks 120 as disclosed herein may be implemented. For example, any suitable ones of the components of the photonic device 2300 may include a die (e.g., the die 2102 of FIG. 12) having one or more microelectronic packages (e.g., microelectronic packages 2200 of FIG. 13).

A number of components are illustrated in FIG. 14 as included in the photonic device 2300, but any one or more of these components may be omitted or duplicated, as suitable for the application. In some embodiments, some or all of the components included in the photonic device 2300 may be attached to one or more motherboards or any suitable support structure. In some embodiments, some or all of these components are fabricated onto a single system-on-chip (SoC) die. Additionally, in various embodiments, the photonic device 2300 may not include one or more of the components illustrated in FIG. 14, but the photonic device 2300 may include interface circuitry for coupling to the one or more components. For example, the photonic device 2300 may not include a processing device 2322, but may include processing device interface circuitry (e.g., a connector and driver circuitry) to which a processing device 2322 may be coupled. In another example, the photonic device 2300 may not include a memory 2324, but may include memory interface circuitry (e.g., connectors and supporting circuitry) to which a memory 2324 may be coupled. In yet another example, the photonic device 2300 may not include a circulator 2318, but may include circulator interface circuitry (e.g., connectors) to which a circulator 2318 may be coupled In some embodiments, the photonic device 2300 may include at least one light source 2302. The light source 2302 may include any suitable device for providing the necessary optical signals for various applications of the photonic device 2300, ranging from communication to sensing and imaging. The light source 2302 may be designed to emit light in a controlled and efficient manner to meet the specific requirements of the photonic device 2300. In some embodiment, the light source 2302 may be a coherent and monochromatic light source such as a laser, to produce light of a well-defined wavelength, low divergence, and high brightness. Examples of lasers that may be included in the light source 2302 include semiconductor lasers, such as edge-emitting lasers and vertical-cavity surface-emitting lasers (VCSELs). Such lasers may be particularly advantageous when the photonic device 2300 is used in applications like optical communication, sensing, and laser-based treatments in medical devices. In some embodiment, the light source 2302 may be a non-coherent light source such as a light-emitting diode (LED) that emits light when an electric current is applied. LEDs may be simpler and more cost-effective than lasers, making them suitable for applications where high coherence is not required. Using an LED as the light source 2302 may be particularly advantageous when the photonic device 2300 is used in applications like displays, optical sensors, and short-distance communication systems. In further embodiments, the light source 2302 may include one or more of a superluminescent diode (SLD), a quantum dot, a rare-earth-doped fiber/waveguide, a plasma source (e.g., plasmonics and microplasma devices), a microcavity resonators, or a nonlinear optical device (e.g., a photonic device that uses nonlinear optical processes, such as frequency doubling or parametric amplification, to generate new wavelengths).

In some embodiments, the photonic device 2300 may include at least one light guiding component 2304, such as a waveguide, to manipulate and control the propagation of light. The light guiding component 2304 may include any suitable waveguide structures designed to confine and guide light along a specified path, allowing it to travel from one point to another with minimal loss and dispersion. Examples of waveguides that may be used as the light guiding component 2304 include planar waveguides, optical fibers, photonic crystal waveguides, and rib waveguides. In some embodiments, the light guiding component 2304 may include a material with a higher refractive index, known as the "core," surrounded by a material with a lower refractive index, known as the "cladding." The refractive index contrast between the core and cladding helps guide light within the core by using total internal reflection. Light is trapped within the core due to its reflection at the core-cladding interface. The light guiding component 2304 may support various modes of light propagation, such as single-mode or multimode.

In some embodiments, the photonic device 2300 may include at least one PIC 2306. A PIC 2306 may be a miniaturized and integrated optical device that incorporates photonic components, such as optical modulators, photodetectors, and waveguides, onto a single substrate. In some embodiments, the PIC 2306 may include one or more optical modulators for encoding data onto an optical signal, e.g., onto light generated by the light source 2302. An optical modulator of the PIC 2306 may change certain properties of an optical signal, such as its amplitude, frequency, or phase, in order to encode information onto the signal or to perform various signal processing functions. Examples of optical modulators that may be implemented in the PIC 2306 include electro-optic modulators, Mach-Zehnder Interferometric (MZI) modulators, or microring modulators. In some embodiments, the PIC 2306 may include one or more photodetectors for detecting and measuring the intensity of light or optical radiation across various wavelengths by converting incident light/photons into an electrical signal. Examples of photodetectors that may be implemented in the PIC 2306 include photodiodes, avalanche photodiodes, phototransistors, PIN diodes, CMOS image sensors, photomultiplier tubes, or quantum photodetectors. In some embodiments, the PIC 2306 may include one or more waveguides, e.g., any of the waveguides described with reference to the light guiding component 2304.

In some embodiments, the photonic device 2300 may include at least one optical coupling component 2308. The optical coupling component 2308 may include any suitable structures designed to facilitate efficient transfer of light between different optical devices, e.g., between the light source 2302 and the light guiding component 2304, between the light source 2302 and the PIC 2306, between the light guiding component 2304 and the PIC 2306, or between the light guiding component 2304 or the PIC 2306 and a further transmission line such as a fiber (not shown in FIG. 14) that may be coupled to the photonic device 2306. Examples of optical coupling elements that may be used to implement the optical coupling component 2308 include fiber couplers (e.g., fused fiber couplers or tapered fiber couplers), waveguide couplers, grating couplers, lens couplers, microlens couplers, prism couplers, fiber array couplers, or ball lens couplers. In some embodiment, the optical coupling component 2308 may include one or more microlense structures 100 as described herein.

In some embodiments, the photonic device 2300 may include at least one wavelength splitter/multiplexer 2310, to combine or split multiple optical signals that are carried at different wavelengths. This may be particular advantageous if the photonic device 2300 is used in an optical communication system such as a wavelength division multiplexing (WDM) system or a dense wavelength division multiplexing (DWDM) system, where multiple data channels are transmitted simultaneously over a single optical fiber using different wavelengths of light. In various embodiments, the wavelength splitter/multiplexer 2310 may include a wavelength division multiplexer, a wavelength division demultiplexer, a passive optical add/drop multiplexer, an arrayed waveguide grating, a fused fiber couplers, and interleavers, or an optical filter based device.

In some embodiments, the photonic device 2300 may include at least one polarization splitter/multiplexer 2312, to combine or split multiple optical signals depending on their polarization. Similarly, in some embodiments, the photonic device 2300 may include at least one polarization controlling component 2314, to control polarization of light generated and manipulated in the photonic device 2300. In various embodiments, a polarization splitter/multiplexer 2312 and a polarization controlling component 2314 may include any suitable structure to enable the manipulation and management of polarized light signals, such as birefringent materials, waveguide structures, or specialized coatings that interact differently with different polarization states.

In some embodiments, the photonic device 2300 may include at least one general power splitter/multiplexer 2316, to combine or split multiple optical signals that in a manner that is not dependent on wavelength or polarization. For example, in some embodiments a power splitter/multiplexer 2316 may be used to tap off a small amount of optical power for purposes or power monitoring in the photonic device 2300. Examples of devices that may be used as a power splitter/multiplexer 2316 include directional couplers and multimode interference couplers.

In some embodiments, the photonic device 2300 may include at least one circulator 2318, also referred to as a "directional splitter." The circulator 2318 may include any suitable device configured to direct light signals to travel in a specific, one-way circular path through its ports. In some embodiments, the circulator 2318 may include magneto-optic materials or other techniques that create a Faraday rotation effect, where the polarization of light is rotated as it passes through the circulator 2318.

In some embodiments, the photonic device 2300 may include at least one mode splitter/multiplexer 2320, to combine or split multiple optical signals based on their guided modes. Examples of devices that may be used as a mode splitter/multiplexer 2320 include directional couplers, multimode interference couplers, tapered waveguide couplers, photonic lanterns, or photonic crystal splitters.

In some embodiments, the photonic device 2300 may include a processing device 2322 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 2322 may include one or more digital signal processors (DSPs), application-specific integrated circuits (ASICs), central processing units (CPUs), graphics processing units (GPUs), cryptoprocessors (specialized processors that execute cryptographic algorithms within hardware), server processors, or any other suitable processing devices. In some embodiments, the processing device 2322 may include circuitry to control operation of other components of the photonic device 2300, e.g., to control operation of the PIC 2306.

In some embodiments, the photonic device 2300 may include a memory 2324, which may itself include one or more memory devices such as volatile memory (e.g., DRAM), nonvolatile memory (e.g., read-only memory (ROM)), flash memory, solid state memory, and/or a hard drive. In some embodiments, the memory 2404 may include memory that shares a die with the processing device 2322. This memory may be used as cache memory and may include embedded DRAM (eDRAM) or spin transfer torque magnetic random-access memory (MRAM). In some embodiments, the memory 2324 may store instructions or data for the processing device 2322 to control operation of other components of the photonic device 2300, e.g., to control operation of the PIC 2306.

The following paragraphs provide examples of various ones of the embodiments disclosed herein.

Example 1 provides a microlens structure, including a glass core; and a lens stack, e.g., a microlens stack, embedded in the glass core (i.e., the lens stack is below all surfaces of the glass core), the lens stack including a plurality of regions stacked in a direction of light propagation through the lens stack during operation, where an individual region of the plurality of regions is a region of a substantially uniform refractive index that is different from a refractive index of the glass core.

Example 2 provides the microlens structure according to example 1, where the plurality of regions includes a first region having a first refractive index and a second region having a second refractive index, and where the first refractive index is equal to the second refractive index.

Example 3 provides the microlens structure according to example 1, where an absolute value of a difference in the refractive index of the glass core and a refractive index of one of the regions (e.g., any one of the regions) of the plurality of regions is between about 0.005 and about 0.015.

Example 4 provides the microlens structure according to any one of examples 1-3, where the plurality of regions includes a first region and a second region, and where the first region is in contact with the second region.

Example 5 provides the microlens structure according to any one of examples 1-3, where the plurality of regions includes a first region and a second region, and where the first region partially overlaps with the second region.

Example 6 provides the microlens structure according to any one of examples 1-3, where the plurality of regions includes a first region and a second region, and where the first region and the second region are spaced apart in the direction of light propagation.

Example 7 provides the microlens structure according to example 6, where a distance between the first region and the second region is between about 0.5 micrometers and 1000 micrometers, e.g., between about 0.5 micrometers and 500 micrometers, or between about 0.5 micrometers and 100 micrometers.

Example 8 provides the microlens structure according to examples 6 or 7, where a distance between the first region and the second region is between about 0.1% and 200% of a dimension of the first region in a direction perpendicular to the direction of light propagation (e.g., such a dimension may be a diameter of the first region in a plane perpendicular to the direction of light propagation), e.g., between about 0.1% and 100%, or between about 0.5% and 50%.

Example 9 provides the microlens structure according to any one of examples 1-8, where the plurality of regions includes a first region and a second region, and where a shape of the first region and a shape of the second region are substantially same.

Example 10 provides the microlens structure according to any one of examples 1-8, where the plurality of regions includes a first region and a second region, and where a shape of the first region is different from a shape of the second region. For example, different shapes of different regions of the stack may be biconvex (a shape that includes two convex surfaces), spherical, aspherical, conical, etc. More generally, a given region of the stack may have any shape required to generate a target phase retardation profile.

Example 11 provides the microlens structure according to any one of examples 1-10, where the plurality of regions includes a first region and a second region, and where, for a given point in the x-y plane of the coordinate system shown in the present drawings, a dimension of the first region in the direction of light propagation and a dimension of the second region in the direction of light propagation are substantially same. For example, these dimensions may be between about 1 micrometer and 1000 micrometers, e.g., between about 5 micrometers and 100 micrometers, or between about 10 micrometers and 40 micrometers.

Example 12 provides the microlens structure according to any one of examples 1-10, where the plurality of regions includes a first region and a second region, and where, for a given point in the x-y plane of the coordinate system shown in the present drawings, a dimension of the first region in the direction of light propagation is different from a dimension of the second region in the direction of light propagation. For example, the difference between the dimension of the second region in the direction of light propagation and the dimension of the first region in the direction of light propagation may be between about 0.1% and 5000% of the dimension of the first region in the direction of light propagation, e.g., between about 5% and 1000%, or between about 10% and 200%.

Example 13 provides the microlens structure according to any one of examples 1-12, where the plurality of regions includes a first region and a second region, and where a width of the first region (e.g., a dimension in a direction perpendicular to the direction of light propagation) and a width of the second region are substantially same. For example, for a given value along the z-axis of the coordinate system shown in the present drawings, a width of any of the plurality of regions may be between about 1 micrometer and 2000 micrometers, e.g., between about 25 micrometers and 750 micrometers, or between about 50 micrometers and 250 micrometers.

Example 14 provides the microlens structure according to any one of examples 1-12, where the plurality of regions includes a first region and a second region, and where a width of the first region is different from a width of the second region. For example, the difference between the width of the second region and the width of the first region may be between about 5% and 1000% of the width of the second region, e.g., between about 20% and 500%, or between about 50% and 200%.

Example 15 provides the microlens structure according to any one of the preceding examples, further including a feature for aligning the lens stack with a further component.

Example 16 provides the microlens structure according to example 15, where the further component is a light guiding component (e.g., a waveguide or an optical fiber), and the feature is an opening in a face of the glass core, the opening to receive the light guiding component.

Example 17 provides the microlens structure according to example 15, where the further component is a PIC including an output coupling element (e.g., an edge coupler) to provide an input light beam to the lens stack, and the feature is an opening in, or a protrusion from, a surface of the glass core.

Example 18 provides the microlens structure according to any one of the preceding examples, where the first region and the second region are two regions of three or more regions stacked in the direction of light propagation.

Example 19 provides the microlens structure according to any one of the preceding examples, where a distance between the lens stack and a surface of the glass core closest to the lens stack is between about 0.05 micrometers and 10000 micrometers, e.g., between about 1 micrometer and 1000 micrometers, or between about 5 micrometers and 100 micrometers.

Example 20 provides the microlens structure according to any one of the preceding examples, where the glass core is a solid layer of glass.

Example 21 provides the microlens structure according to any one of the preceding examples, where a cross-section of the glass core in a plane perpendicular to the direction of light propagation is substantially rectangular.

Example 22 provides the microlens structure according to any one of the preceding examples, where a cross-section of the glass core in a plane parallel to the direction of light propagation is substantially rectangular.

Example 23 provides the microlens structure according to any one of the preceding examples, where the glass core is a layer of glass including at least 23% silicon by weight.

Example 24 provides the microlens structure according to any one of the preceding examples, where the glass core is a layer of glass including at least 26% oxygen by weight.

Example 25 provides the microlens structure according to any one of the preceding examples, where the glass core is a layer of glass including at least 23% silicon by weight and at least 26% oxygen by weight.

Example 26 provides the microlens structure according to any one of the preceding examples, where the glass core is a layer of glass including at least 5% aluminum by weight.

Example 27 provides the microlens structure according to any one of the preceding examples, where the glass core is a layer of glass that does not include an organic adhesive or an organic material.

Example 28 provides a photonic device, including a PIC; and a layer of glass including silicon, oxygen, and aluminum, the layer of glass having a bulk portion and microlens portion, where: the layer of glass is aligned with the PIC to receive a light beam output by the PIC, the microlens portion includes regions stacked along an optical axis of the light beam, and a refractive index of an individual region is substantially constant across a total width of the individual region and is different from a refractive index of the bulk portion of the layer of glass by at least about 0.005.

Example 29 provides the photonic device according to example 28, where the refractive index of the individual region is further substantially constant across a total length of the individual region, where the width of the individual region is a dimension measured in a plane perpendicular to the optical axis and the length of the individual region is a dimension measured along the optical axis.

Example 30 provides the photonic device according to examples 28 or 29, where at least one of the regions has a first length at a first distance from the optical axis and has a second length at a second distance from the optical axis, where the first length and the second length are dimensions of the at least one of the regions measured in a direction parallel to the optical axis.

Example 31 provides the photonic device according to any one of examples 28-30, where the layer of glass includes at least 23% silicon by weight and at least 26% oxygen by weight.

Example 32 provides the photonic device according to any one of examples 28-31, where the layer of glass includes at least 5% aluminum by weight.

Example 33 provides the photonic device according to any one of examples 28-32, further including a light guiding component; and an optical coupling component for coupling the light beam output by the PIC to the light guiding component where the optical coupling component includes the layer of glass.

Example 34 provides the photonic device according to example 33, where the light guiding component is a waveguide.

Example 35 provides the photonic device according to example 33, where the light guiding component is a transmission line.

Example 36 provides the photonic device according to example 33, where the light guiding component is a fiber.

Example 37 provides the photonic device according to any one of examples 28-36, where the PIC includes at least one of a light source, an optical modulator, a photodetector, or a waveguide.

Example 38 provides the photonic device according to any one of examples 28-37, further including a light source to generate the light beam.

Example 39 provides the photonic device according to any one of examples 28-38, further including a circulator.

Example 40 provides the photonic device according to any one of examples 28-39, further including at least one of a wavelength splitter, a polarization splitter, or a mode splitter.

Example 41 provides a microelectronic assembly, including a die; and a further component coupled to the die, where the die includes a microlens structure according to any one of the preceding examples or a photonic device according to any one of the preceding claims, e.g., the die includes a solid layer of glass rectangular in shape in a cross-sectional side view, and a stack of regions within the solid layer of glass, where each region of the stack of regions has a refractive index different from a refractive index of the solid layer of glass.

Example 42 provides the microelectronic assembly according to example 41, where the further component is one of a package substrate, a circuit board, an interposer, or another die.

Example 43 provides the microelectronic assembly according to examples 41 or 42, further including one or more interconnects to couple the further component to the die.

The above description of illustrated implementations of the disclosure, including what is described in the Abstract, is not intended to be exhaustive or to limit the disclosure to the precise forms disclosed. While specific implementations of, and examples for, the disclosure are described herein for illustrative purposes, various equivalent modifications are possible within the scope of the disclosure, as those skilled in the relevant art will recognize. These modifications may be made to the disclosure in light of the above detailed description.

The invention claimed is:

1. A microlens assembly, comprising:

a glass core; and a lens stack embedded in the glass core, the lens stack comprising a plurality of regions stacked in a direction of light propagation through the lens stack during operation, wherein an individual region of the plurality of regions is a region of a substantially uniform refractive index that is different from a refractive index of the glass core, wherein the plurality of regions includes a first region and a second region, and wherein the first region is in contact with the second region.

2. The microlens assembly according to claim 1, wherein the first region has a first refractive index, the second region has a second refractive index, and the first refractive index is equal to the second refractive index.

3. The microlens assembly according to claim 1, wherein the plurality of regions further includes a third region, and wherein the first region and the third region are spaced apart in the direction of light propagation, and wherein a distance between the first region and the third region is between about 0.1% and 200% of a dimension of the first region in a direction perpendicular to the direction of light propagation.

4. The microlens assembly according to claim 1, wherein a shape of the first region is different from a shape of the second region.

5. The microlens assembly according to claim 1, wherein a difference between a dimension of the second region in the direction of light propagation and a dimension of the first region in the direction of light propagation is between about 0.1% and 5000% of the dimension of the first region in the direction of light propagation.

6. The microlens assembly according to claim 1, wherein a difference between a width of the first region and a width of the second region is between about 5% and 1000% of the width of the second region.

7. The microlens assembly according to claim 1, further comprising a feature for aligning the lens stack with a further component.

8. The microlens assembly according to claim 7, wherein the further component is a light guiding component, and the feature is an opening in a face of the glass core, the opening to receive the light guiding component.

9. The microlens assembly according to claim 7, wherein the further component is a photonic integrated circuit (PIC) comprising an output coupling element to provide an input light beam to the lens stack, and the feature is an opening in, or a protrusion from, a surface of the glass core.

10. The microlens assembly according to claim 1, wherein the glass core is a layer of glass comprising at least 5% aluminum by weight.

11. The microlens assembly according to claim 1, wherein the glass core is a layer of glass that does not include an organic adhesive or an organic material.

12. The microlens assembly according to claim 1, wherein at least one region of the plurality of regions is biconvex.

13. A photonic device, comprising:

a photonic integrated circuit (PIC); and a layer of glass, the layer of glass having a microlens portion monolithic with a bulk portion, wherein:

the layer of glass is aligned with the PIC to receive a light beam from the PIC, the microlens portion includes regions stacked along an optical axis of the light beam, a refractive index of an individual region is substantially constant across a width of the individual region and is different from a refractive index of the bulk portion of the layer of glass by at least about 0.005, and at least one region of the regions is a biconvex lens.

14. The photonic device according to claim 13, wherein the refractive index of the individual region is further substantially constant across a length of the individual region, wherein the width of the individual region is a dimension measured in a plane perpendicular to the optical axis and the length of the individual region is a dimension measured along the optical axis.

15. The photonic device according to claim 13, wherein at least one of the regions has a first length at a first distance from the optical axis and has a second length at a second distance from the optical axis, wherein the first length and the second length are dimensions of the at least one of the regions measured in a direction parallel to the optical axis.

16. The photonic device according to claim 13, wherein the layer of glass includes at least 23% silicon by weight and at least 26% oxygen by weight.

17. The photonic device according to claim 13, no portion of any of the regions is at a surface of the layer of glass.

18. The photonic device according to claim 13, wherein the regions include a first region and a second region, and wherein the first region is in contact with the second region.

19. The photonic device according to claim 13, wherein, in a plane perpendicular to an optical axis of the biconvex lens and comprising a portion of the biconvex lens, a portion of the bulk portion surrounds the portion of the biconvex lens.

20. The photonic device according to claim 13, wherein the layer of glass includes silicon, oxygen, and aluminum.

21. A microelectronic assembly, comprising:

a die; and a further component coupled to the die, wherein:

the die includes a solid layer of glass rectangular in shape in a cross-sectional side view, the solid layer of glass has a first surface and a second surface opposite the first surface, the die further includes a stack of regions within the solid layer of glass, each region of the stack of regions has a refractive index different from a refractive index of the solid layer of glass, a first region of the stack of regions is a region closer to the first surface of the solid layer of glass than all other regions of the stack of regions, a second region of the stack of regions is a region closer to the second surface of the solid layer of glass than all other regions of the stack of regions, a non-zero distance separates the first region from the first surface solid layer of glass, and a non-zero distance separates the second region from the second surface solid layer of glass.

22. The microelectronic assembly according to claim 21, wherein at least one region of the stack of regions has a biconvex shape.

23. A photonic device, comprising:

a photonic integrated circuit (PIC); and a layer of glass, the layer of glass comprising a microlens portion and a bulk portion, wherein:

the layer of glass is aligned with the PIC to receive a light beam from the PIC, the microlens portion is unitary with the bulk portion, the microlens portion includes a region, and a refractive index of the region is substantially constant across a width of the region and is different from a refractive index of the bulk portion of the layer of glass by at least about 0.005.

24. The photonic device according to claim 23, wherein:

the microlens portion includes a plurality of regions stacked along an optical axis of the light beam, and the region is one region in the plurality of regions.

25. The photonic device according to claim 23, wherein the region is a biconvex lens.

* * * * *